Nov. 5, 1929.                    C. R. LAW                    1,734,866
VALVE MECHANISM
Filed April 18, 1927          3 Sheets-Sheet 2
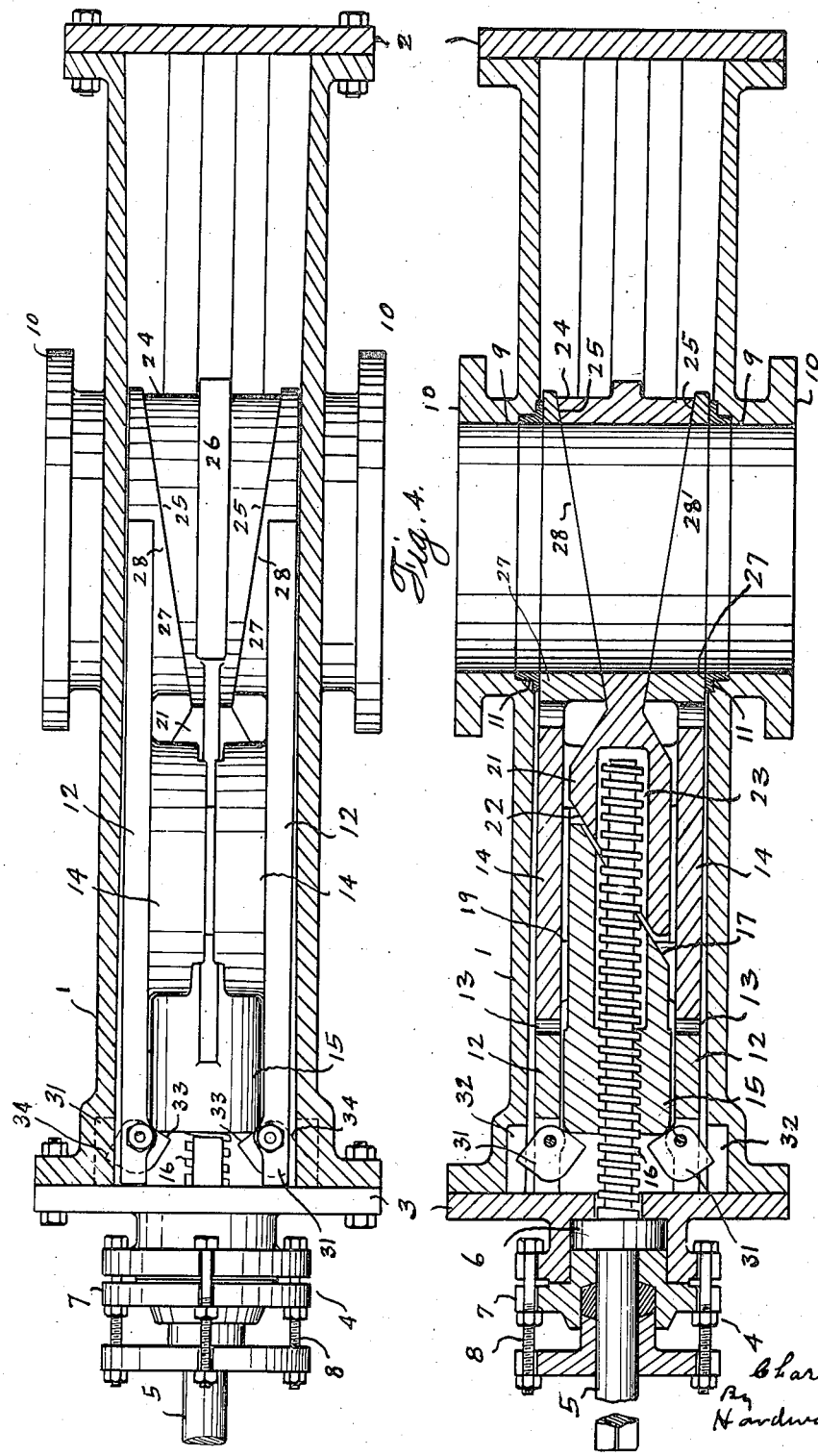
Inventor
Charles R. Law
By Hardway & Cathey
Attorneys Nov. 5, 1929.  C. R. LAW  1,734,866
VALVE MECHANISM
Filed April 18, 1927   3 Sheets-Sheet 3
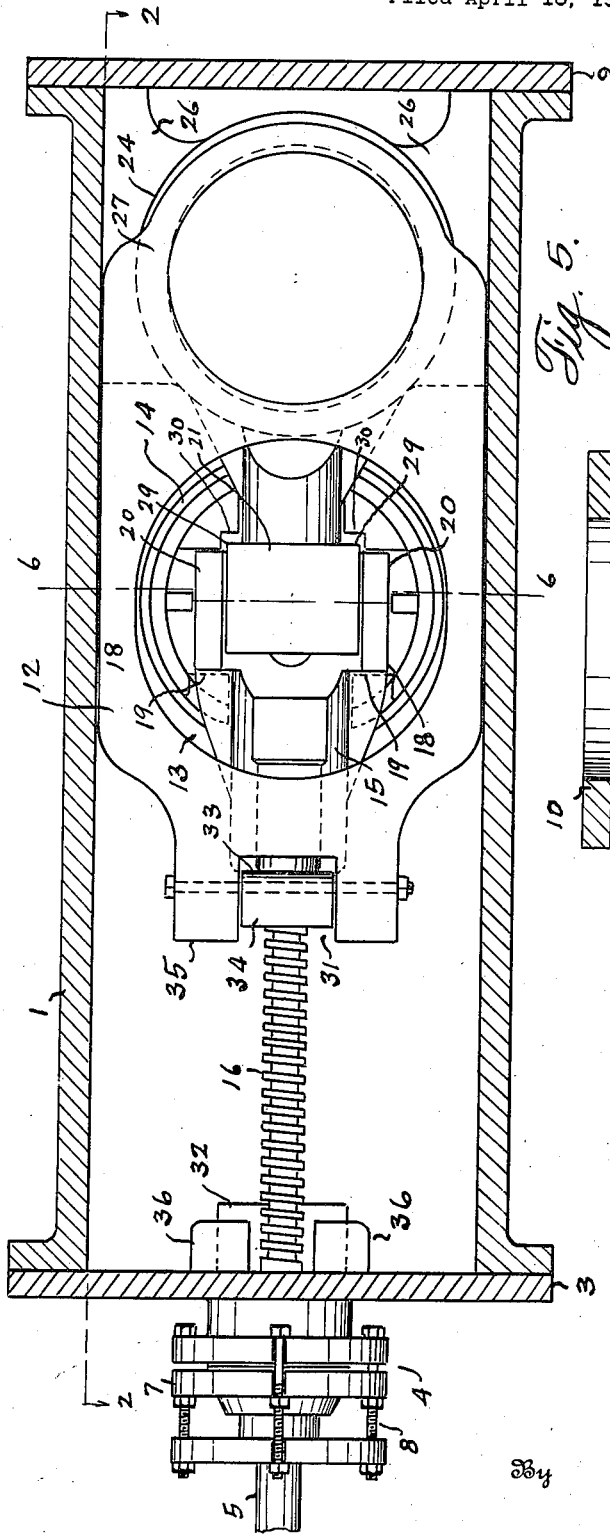
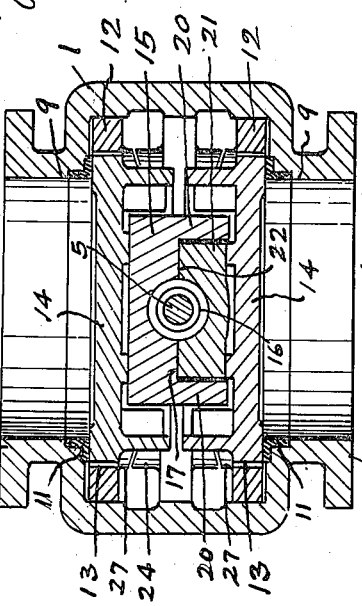
Inventor
Charles R. Law
By Hardway Cather
Attorneys Patented Nov. 5, 1929

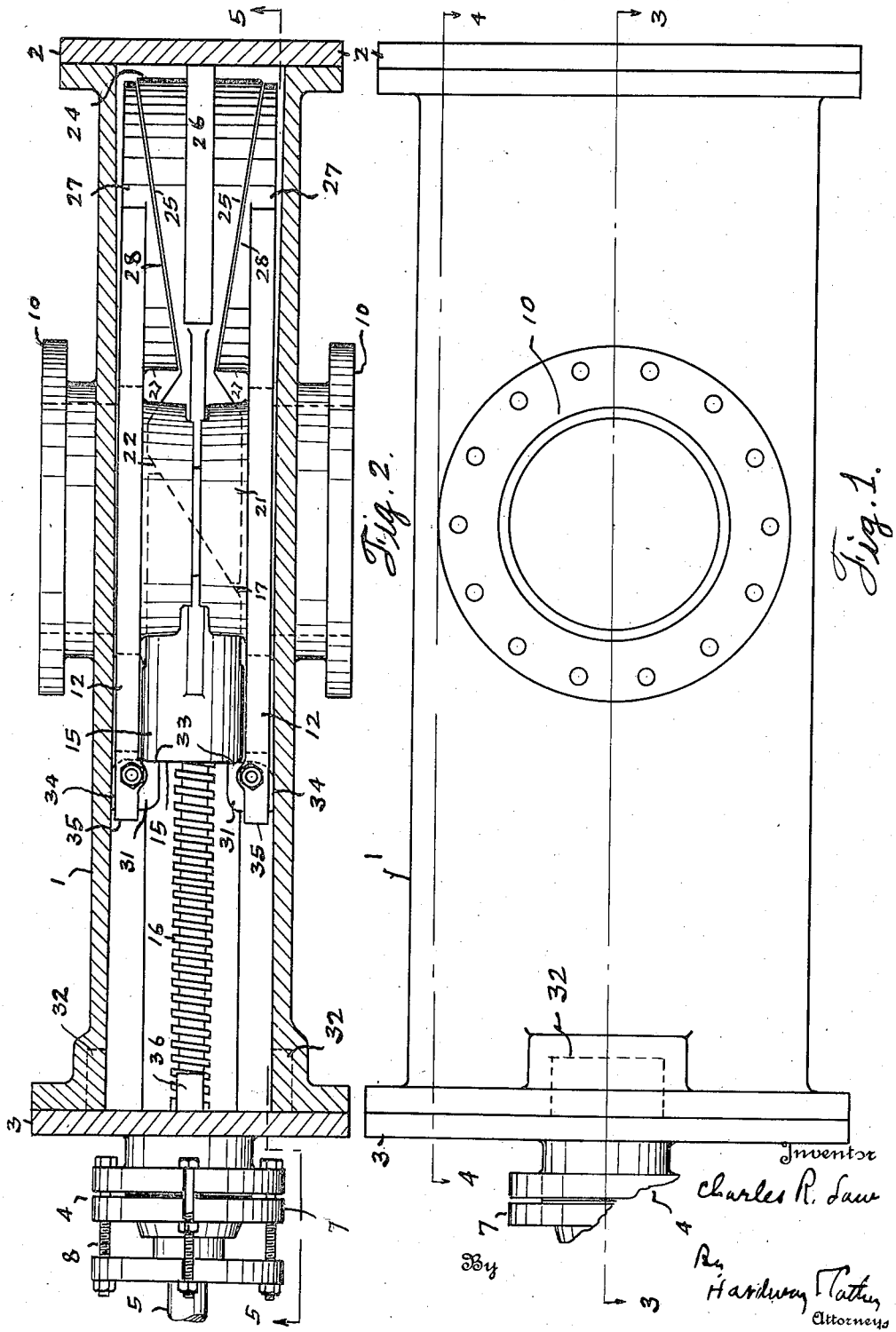

1,734,866

UNITED STATES PATENT OFFICE

CHARLES R. LAW, OF MANSFIELD, LOUISIANA, ASSIGNOR TO THE LAW COMPANY, INCORPORATED, OF MANSFIELD, LOUISIANA, A CORPORATION OF LOUISIANA

VALVE MECHANISM

Application filed April 18, 1927. Serial No. 184,637.

This invention relates to new and useful improvements in a valve mechanism.

One object of the invention is to provide a mechanism of the character described specially designed for the purpose of controlling conduits such as pipe lines and the like.

Another object of the invention is to provide a controlling valve mechanism of such construction that when open it will not be liable to be injured by solid bodies carried in the fluid flowing through the flow line, or conduit, with which the valve mechanism is connected, and which will not be liable to collect offending matter in the structure to prevent the close seating of the valves when it is desired to close the conduit. The controlling valve now in common use on pipe lines embodies a casing and a valve mechanism therein for controlling the flow of fluid through the line into which said casing is incorporated and this casing is formed with a depression, or pocket, between and beneath the valve seats. The fluid is pumped through the line under strong pressure and in the fluid there is always certain foreign matter, including solid bodies, and with the present construction the valve seats are exposed to the path of such foreign matter and are injured and worn away thereby. Furthermore objects, particularly heavy objects, will collect in said pocket, when the valves are open, and when so collected often interfere with or entirely prevent, the seating of the valves, permitting a leakage past them. It is very desirable that pipe line valves operate with precision, and particularly that they do not leak when closed. This is desirable for reasons well known to pipe line operators and which need not be here specifically stated.

It is the prime object of this invention to provide a mechanism of the character described which, when opened, will offer no inwardly projecting parts, or shoulders exposed to the path of travel of the fluid or foreign bodies carried thereby and the construction of which provides no depressions, or pockets, in which foreign matter may collect to interfere with the operation, or perfect seating of the valves.

A further feature of the invention resides in a device of the character described, the operative mechanism of which is completely enclosed and protected and which may be easily and accurately operated from without the enclosing casing.

With the above and other objects in view this invention has particular relation to certain novel features of construction, operation and arrangement of parts, an example of which is given in this specification and illustrated in the accompanying drawings, wherein:—

Figure 1 shows a side elevation of the complete mechanism.

Figure 2 shows a sectional view taken on the line 2—2 of Figure 5.

Figure 3 shows a longitudinal sectional view taken on the line 3—3 of Figure 1.

Figure 4 shows a longitudinal sectional view taken on the line 4—4 of Figure 1.

Figure 5 shows a longitudinal sectional view taken on the line 5—5 of Figure 2, and Figure 6 shows a cross sectional view taken on the line 6—6 of Figure 5.

Referring now more particularly to the drawings, wherein like numerals of reference designate similar parts in each of the figures the numeral 1 designates a casing which encloses the operative mechanism and which has the end plates 2 and 3, preferably detachable therefrom. The end plate 3 carries a suitable stuffing box designated generally by the numeral 4. An actuating rod 5 works through this stuffing box and has an annular rib 6 thereon located between the end plate 3 and the gland 7, forming part of said stuffing box. The stuffing box, generally stated, may be of any conventional construction and is held in assembled relation with the end plate 3 by suitable bolts, as 8. The rod 5 may be manipulated or turned by means of the conventional hand wheel (not shown) or by any other appliance suitable for the purpose. The casing 1 has oppositely disposed openings 9, 9, surrounded by the flanged connections 10, 10, to which the adjacent sections of a pipe line, or flow line may be connected, the connections 10 forming continuations of the conduit through said line and these connections have oppositely disposed annular valve seats 11, 11 which are preferably detachable.

Within the casing are oppositely disposed actuating plates 12, 12, forming actuating frames which work adjacent opposite sides of the casing 1. These plates have oppositely disposed substantially elliptical openings 13, 13 therethrough which are in substantial alignment and the plates 12 are of a width to extend substantially from the top to the bottom of the casing, as shown more particularly in Figure 5.

Oppositely working valves 14, 14, are provided which are movable into active position to seat against the seats 11 to close the flow line or conduit and are also movable into inactive position to open said conduit, as will be more particularly hereinafter set out. These valves work in the openings 13 and are movable into and out of alignment with the seats 11 through said plates 12, as will also be more specifically hereinafter explained. Between the plates 12 there is an actuating nut 15 and the inner end of the rod 5 extends through said nut and has the threads 16, which have a threaded connection with said nut. The inner end of the nut 15 extends between the valves 14 and has a sloping or beveled face 17 and said inwardly extending end is formed with shoulders 18, 18, which are opposite and adapted to engage with the corresponding inwardly extended shoulders 19, 19, projecting inwardly from the opposing faces of the valves 14. The inwardly extended end of the nut 15 also has the inwardly extending oppositely disposed side flanges 20, 20, which embrace the wedge member 21 which has the sloping face 22 reversely beveled with respect to, and adapted to cooperate with, the sloping face 17 into which the inwardly extended end of the nut 15 is formed. The end of the wedge member 21, adjacent the inwardly extended end of the nut 15 has a deep socket 23 into which the inner end of the actuating rod 15 may work and the other end of the wedge member 23 is formed into a ring 24 whose opposite sides are outwardly tapered or flared forming substantially annular faces 25, 25, and this ring is formed with the oppositely disposed wings 26, 26, whose outer or free edges are adapted to ride against the corresponding sides of the casing thereby forming guides and the outer ends of the wings form abutments adapted to abut the end plate 2 of the casing when the valves are in active or closed position. The corresponding ends of the plates 12, 12 are also formed into rings, as 27, 27, whose inner faces 28, 28, are sloping or beveled to conform to the slope of and are thus adapted to fit closely against the opposing sloping faces 25 of the ring 24. The inside diameter of the rings 24 and 27 are substantially equal and each substantially equal to the inside diameters of the seats 11, 11, and the wedge member 21 is formed with opposing shoulders 29, 29, forming abutments which are adapted to engage against the corresponding inwardly extending shoulders 30, 30, carried by each of the valves 14, 14, thus forming operative connections between said wedge member 21 and said valves.

Adjacent the outer end of the nut 15 are the dogs 31, 31, which are pivotally connected to the corresponding ends of the plates 12 and which are provided to form operative connections between the nut 15, and said plates 12, 12, and adjacent the end plate 3 the casing 1 is provided with the inside pockets 32, 32, into which said dogs may work to permit their release from said nut, the purpose of all of which will be hereinafter more accurately explained.

The operation of the mechanism will now be described:—Assuming that the valves 14, 14, are seated against the respective seats 11, 11, and the conduit to be controlled closed, as shown in Figures 5 and 6; if it be now desired to open the flow line and to move said valves into inactive position the rod 5 may be suitably turned to exert a pull through the nut 15 and this will immediately release the sloping face 17 from the sloping face 22, which in turn will release the outward pressure of the corresponding wedge members against the inner sides of said valves thus releasing the valves from their seats and leaving them free to move.

As the nut 15 is moved on, through its threaded connection with the rod 5, its outer end will abut the opposing ends 33, 33, of the dogs 31 and these dogs will be held in such abutting relation by reason of the fact that their outer sides 34, 34, ride against the opposing sides of the casing 1. Through these dogs 31 the side plates 12 will be carried along with said nut and the valves 14 being located in openings 13 in said side plates will move along with said plates out of alignment with the flow line or conduit and into inactive position and the wedge member 24, being in operative connection with the valves 14, 14, through the opposing shoulders 29 and 30, said rings 24 and 27 will move in concert with the movement of said valves so that as the valves are moved out of alignment with the seats 11, and the flow line, said rings 24 and 27 will be moved into alignment therewith. When the rings 27 align with the valve seats 11 the opposing ends 35, 35, of the plates 12 will abut the opposing end plate 3 and the movement of said plates, 12 in this direction will be stopped. Simultaneously the free ends of the dogs 31 will recede into their pockets 32, thus releasing them from the nut 15 and the rod 5, being further rotated, the nut 15 will be further moved or advanced, thus propelling the valves 14 further along into inactive position. This additional valve movement will be permitted by reason of the fact that the openings 13 are, as stated, slightly elliptical, and this additional movement of the valves will operate through the construction described, to draw the ring 24 with wedge like effect into perfect alignment with the rings 27, in which alignment it will be stopped by the contact of the nut 15 with the inwardly extending lugs 36, 36 carried by the end plate 3. The sloping faces 25 acting against the sloping faces 28 of the rings 27 spread said rings and securely seat them against the seats 11, said rings 24 and 27 thus forming a complete conduit or flowway through the casing. This conduit or flowway will be of substantially uniform diameter without any internal projections to engage or retain foreign matter in the fluid passing through the line and will further seat against and protect the seats 11 against contact with or injury by solid objects, sand or grit carried by the fluid flowing through said line. When it is desired to close the flow line the rotation of the rod 5 will be reversed, which will cause a reverse movement of the nut 15. Upon reverse movement of the nut 15 the entire mechanism described will be moved backwardly along the casing, the inwardly extending end of said nut abutting against the opposing end of the wedge member 21 to release the ring 24 from the rings 27 so as to free said rings from the seats 11 and a continued rotation of the rod 5 will carry the valves 14, the plates 12 and the ring 24 backwardly until the wings 26 abut the end plate 2 thus stopping the backward movement of the wedge member 21. In this position the valves 14 will be aligned with the seats 11 and the further rotation of the rod 5 will force the sloping faces 17 and 22 into cooperative relation and this will act with wedge like effect to force said valves apart and seat them securely against the corresponding seats 11 and thus securely close the flow line or conduit.

It will thus be observed that as the valves are moved into inactive or open position a supplemental conduit is provided to take its place between the valve seats 11 and form a continuous unobstructed passageway through the valve casing without internal projections and with all parts of the mechanism protected against injury from objects in the fluid flowing through said line and without internal cavities, or pockets into which the offending matter may collect.

I have illustrated and described one form of this mechanism, which I now believe to be a preferred form of the device but it is obvious that mechanical changes or adaptations may be made, without departing from the principle of the invention, if it be hereafter desired to do so, and I hereby reserve the right to make such mechanical changes or adaptations as may be comprehended within the scope of the appended claims.

What I claim is:—

1. The combination with a fluid conduit, of a casing incorporated into the conduit; a valve mechanism in the casing movable into active position to close said conduit and into inactive position to open the conduit, means in the casing having an opening and movable in concert with the valve mechanism to align its opening with the conduit when the valve mechanism is moved to said inactive position, said means comprising side frames and an intermediate annular wedge member all operatively connected with and operable by the valve mechanism.

2. The combination with a fluid conduit, of a casing incorporated into the conduit, a valve mechanism in the casing movable into active position to close said conduit and into inactive position to open said conduit, a means in the casing having an opening and movable in concert with the valve mechanism to dispose said opening in alignment with the conduit when the valve mechanism is moved to said inactive position and out of such alignment when the valve mechanism is moved to active position, said means including a pair of rings having inside sloping faces and an intermediate annular wedge adapted to cooperate with said faces.

3. The combination with a fluid conduit, of a casing incorporated into said conduit, spaced valve seats aligned with the conduit, a valve mechanism in the casing embodying oppositely working valves which are movable into active position to seat against said seats to close said conduit, and which are movable into inactive position to open said conduit, means in the casing movable into cooperating relation with said seats, when the valves are in inactive position, to form a supplemental conduit between said seats, whose inside diameter is substantially uniform and substantially equal to the inside diameter of said seats, said means comprising side rings adapted to seat against said seats and an intermediate annular wedge adapted to work between said side rings, and means for manipulating said valves.

4. A device of the character described comprising a casing having oppositely disposed openings with surrounding seats, a valve mechanism in the casing including a pair of valves movable into active position into cooperating relation with said seats to close the openings and also movable into inactive position to open said openings, means for manipulating said valves into active or inactive position, and means in the casing movable into alignment with said openings, when the valves are in inactive position to form a continuous conduit connecting said openings, said conduit comprising side rings having inside sloping faces and an intermediate ring having sloping faces adapted to cooperate with the faces of said side rings to seat said side rings securely against said valve seats, and operative connections between said rings and the valves through which the former are moved in substantial concert with the latter.

5. A device of the character described including a casing having openings adapted for the connection of the sections of a flow line, or conduit, into said casing, means in the casing movable into active or closed position, to close said openings and thereby block the flow of fluid through said line, said means being also movable into inactive or open position to permit the flow of fluid through said line, and other means in the casing movable into position to connect said openings, when said first mentioned means is in inactive position, to form a connecting conduit between said openings said other means comprising side rings having inside sloping faces and an intermediate ring having oppositely disposed sloping faces adapted to cooperate with the sloping faces of the side rings to form tight joints, said connecting conduit being of substantially uniform inside diameter throughout.

6. A device of the character described including a casing having openings adapted for the connection of sections of a flow line, or conduit, into the casing, means in the casing movable into position to connect said openings and to form a continuation of said conduit through said casing, said means embodying a pair of side rings having inside sloping faces and an intermediate ring having sloping faces adapted to work against the sloping faces of said side rings, and means for assembling said rings in such connecting relation.

7. A device of the character described including a casing having openings adapted for the connection of sections of a flow line, or conduit, into the casing, means in the casing movable into position to connect said openings and to form a continuation of said conduit through said casing, said means comprising a pair of annular parts formed with sloping faces and an intermediate annular part having sloping faces, said faces cooperating to form close fitting joints, when said parts are moved into assembled relation in position to connect said openings, and means for moving said parts into such relation.

8. A device of the character described including a casing having openings adapted for the connection of sections of a flow line into the casing, oppositely disposed valves movable into active position to close said openings and into inactive position to open said openings, valve actuating means for moving said valves into either of said positions, side frames operatively connected with said valve actuating means, and each having a ring, said rings having inside sloping faces, an annular wedge between said rings which cooperates with said faces, said rings and wedge forming a continuous conduit between said openings when the valves are in inactive position.

9. A device of the character described comprising a casing having oppositely disposed openings with surrounding seats and also having oppositely disposed inside pockets, a valve mechanism in the casing including a pair of valves movable into active position in cooperating relation with said seats to close the openings and also movable into inactive position to open said openings, means for manipulating said valves into active or inactive position, a pair of side frames in the casing having openings in which the valves work loosely, releasable means on the side frames with which the valve manipulating means engage to move said frames in concert with the valves when the valves are moved to inactive position, said releasable means being adapted to work into said pockets to effect the release of said valve manipulating means from said frames, side rings carried by said frames, an annular wedge between said rings operatively connected with the valve manipulating means, said rings and wedge forming a continuous conduit between said openings when the valves are in inactive position.

10. A device of the character described comprising a casing having openings with surrounding inside seats, a valve mechanism in the casing including a pair of valves movable into active position in cooperative relation with said seats to close said openings, and also movable into inactive position to open said openings, mechanism for moving the valves into active or inactive position, a pair of frames associated with the valves, means in the casing movable into cooperating relation with said seats, when the valves are in inactive position, to form a conduit through said casing between said seats, said means including side rings carried by said frames and having inside sloping faces, and an annular wedge between said rings and operatively connected with said valve moving mechanism, said valve moving mechanism and frames being provided with releasable interconnecting means, through which the frames are moved in concert with the valves, when the valves are moved into inactive position, means for stopping the movement of said frames, in said direction, with the side rings in alignment with said seats, and means for releasing said interconnecting means, to permit the further movement of said wedge, whereby said side rings are forced into firm contact with said seats.

11. In a valve mechanism having a casing provided with side openings and inside recesses; a pair of side frames each having an oblong opening, a ring carried by each frame, said rings having diverging inside faces, oppositely disposed valves disposed in the respective frame openings, an intermediate annular wedge disposed between said rings, pivotally mounted dogs on the frames adapted to be aligned with said recesses, means for moving said valves into and out of registration with said side openings, said valve moving means being engageable with said dogs and being operable, through said dogs to also move said side frames, said recesses being disposed to receive said dogs to permit their release from said valve moving means, and operative connections between said wedge and said valve moving means.

12. The combination with a fluid conduit, of a casing incorporated into the conduit, valves in the casing movable into active position to close said conduit and into inactive position to open the conduit, means in the casing and operatably connected with the valves and movable with the valves into active position in substantial alignment with said conduit to form a continuation of said conduit through the casing, and into inactive position out of such alignment, said means including members having passageways therethrough and also having sloping cooperating faces, means for stopping some of said members in advance of another, in such alignment with the conduit as said members are moved into such active position, another of said members being further movable, with the valves, into such alignment, said sloping contacting faces operating, upon such further movement, to seat said members firmly against each other and against the opposing sides of the casing.

13. A valve mechanism including a valve casing having oppositely disposed valve seats, spaced apart, valves in the casing movable into active position to seat against and close said seats and into inactive position to open said seats, means in the casing and operatably connected with the valves and movable with the valves into active position, into substantial alignment with the seats to form a continuous conduit in the casing between said seats, and movable into inactive position out of alignment with the seats, said means including annular members having sloping cooperating faces, means for stopping some of said members, in advance of other of said members, in such alignment with said seats, as said members are moved into such active position, said other of said annular members being further movable with the valves, into such alignment, said sloping cooperating faces operating, upon such further movement to seat said annular members firmly against each other and against said valve seats.

14. A valve mechanism including a valve casing having oppositely disposed valve seats, spaced apart, valves in the casing movable into active position to seat against and close said seats and into inactive position to open said seats, means in the casing and operatively connected with the valves and movable, as the valves move, into active position into substantial alignment with the seats to form a continuous conduit in the casing between said seats, and movable into inactive position out of alignment with the seats, said means including annular members having sloping cooperating faces, means for stopping some of said members, in advance of other of said members, as said members are moved into such active position, said other of said annular members being further movable into such alignment, said sloping cooperating faces operating, upon such further movement, to seat said annular members firmly against each other and against said valve seats.

15. A valve mechanism including a valve casing having oppositely disposed valve seats spaced apart, valves in the casing movable into active position to seat against and close said seats and movable into inactive position to open said seats, means for moving said valves into active or inactive position, means in the casing movable into active position into substantial alignment with the seats to form a continuous conduit in the casing between said seats and movable into inactive position out of alignment with said seats, said means including annular members having sloping cooperating faces, releasable means engaged by said moving means for connecting said valve moving means with some of said members and moving the same in advance of other of said members as said members are moved toward such active position, said casing having a recess and said releasable means being arranged to recede into said recess to effect the release of said valve moving means from said member to which the same is connected, means for stopping the movement of such disconnected member, means for further moving said other of said members into said active position in such alignment, said sloping cooperating faces operating upon said further movement to seat said members firmly against each other and against said valve seats.

16. A valve mechanism including a valve casing having spaced openings, an inside valve seat around each opening, valves in the casing movable into active position, against said seats to close said openings, and into inactive position, to open said openings, members in the casing having passageways therethrough and having sloping contacting faces and movable into active position, into substantial alignment with said seats to form a continuous conduit through said casing between said openings, and also movable in inactive position out of such alignment, means for moving said members into said active position, one in advance of another, means for stopping said advanced member in substantial alignment with said seats, said moving means also including means for further moving said other member into such substantial alignment, said contacting faces being operative, upon such further movement, to seat said members firmly against each other and against said seats.

17. A valve mechanism including a valve casing having spaced openings, an inside valve seat around each opening, valves in the casing movable into active position, against said seats to close said openings, and into inactive position, to open said openings, members in the casing having passageways therethrough and having sloping contacting faces and movable into active position, into substantial alignment with said seats to form a continuous conduit through said casing between said openings, and also movable into inactive position out of such alignment, means for moving said members into said active position, one in advance of another, means for stopping said advanced member in substantial alignment with said seats, said moving means also including means for further moving said other member into such substantial alignment, said contacting faces operating upon such further movement, to seat said members firmly against each other and against said seats, said moving means being also effective to move the valves in concert with said members.

In testimony whereof I have signed my name to this specification.

CHARLES R. LAW.

DISCLAIMER 1,734,866.—*Charles R. Law*, Mansfield, La. VALVE MECHANISM. Patent dated November 5, 1929. Disclaimer filed April 11, 1931, by the assignee, *The Law Company, Incorporated*.

Hereby enters this disclaimer to so much of claim 12 of said patent as is in excess of the following:

" The combination with a fluid conduit, of a casing incorporated into the conduit, valves in the casing movable into active position to close said conduit and into inactive position to open the conduit, means in the casing and operatably connected with the valves and movable with the valves into active position in substantial alignment with said conduit to form a continuation of said conduit through the casing, and into inactive position out of such alignment, said means including members having passageways therethrough and also having sloping cooperating faces, means for stopping some of said members in advance of another, in such alignment with the conduit as said members are moved into such active position, another of said members being further movable, with the valves, into such alignment, said sloping contacting faces operating, upon such further movement, to seat said members firmly against each other, and against the opposing sides of the casing, there being sloping contacting faces effective to seat the valves in their final active position and which are arranged diagonally with respect to the sloping contacting faces of said conduit members."

Your petitioners also enter the following disclaimer to claim 13, to wit:

Your petitioners disclaim from claim 13 all movable valves within the scope of said claim 13 except valves having sloping cooperating faces associated therewith for seating said valves in final active or closed position, said cooperating faces being disposed in angular relation to the sloping cooperating faces for seating the conduit members against the valve seats.

Your petitioners also enter this disclaimer to so much of claim 16 of said patent as is in excess of the following:

" A valve mechanism including a valve casing having spaced openings, an inside valve seat around each opening, valves in the casing movable into active position, there being associated sloping contacting faces whereby the valves are caused to seat against said seats to close said openings when in said active position, said valves being also movable into inactive position to open said openings, members in the casing having passageways therethrough and also having other sloping contacting faces and movable into active position, into substantial alignment with said seats to form a continuous conduit through the casing between said openings and also movable into inactive position out of such alignment, means for moving said members into said active position, one in advance of another, means for stopping said advanced member in substantial alignment with said seats, said moving means also including means for further moving said other member into such substantial alignment, said contacting faces of said members being operative, upon such further movement, to seat said members firmly against each other and against said seats."

[*Official Gazette April 28, 1931.*]